United States Patent [19]

Brown

[11] 4,155,486

[45] May 22, 1979

[54] ROTARY FEEDER

[76] Inventor: Winfred E. Brown, 555 Tamarac Dr., Pasadena, Calif. 91105

[21] Appl. No.: 845,359

[22] Filed: Oct. 25, 1977

[51] Int. Cl.$^2$ .................. B65G 65/70; G01F 11/10
[52] U.S. Cl. .................................. 222/197; 222/368
[58] Field of Search .............. 222/197, 264, 342, 292, 222/293, 298, 305, 344–346, 348, 349, 367, 368, 410; 221/265; 214/35 A

[56] References Cited

U.S. PATENT DOCUMENTS

| | | | |
|---|---|---|---|
| 2,858,212 | 10/1958 | Durant et al. ....................... | 222/368 |
| 3,052,383 | 9/1962 | Transeau ........................... | 222/368 |
| 3,603,001 | 9/1971 | Arnold et al. ...................... | 222/368 |

*Primary Examiner*—Robert J. Spar
*Assistant Examiner*—H. Grant Skaggs
*Attorney, Agent, or Firm*—Christie, Parker & Hale

[57] ABSTRACT

A rotary feeder has a valvular rotor rotating on an axis in a cylindrical cavity. A plurality of rigid, free-floating blades project from a hub of the rotor to delimit several material-receiving pockets circumferentially distributed over the hub. The inner edges of the blades rest in axial recesses in the hub and are supported by fixed projections extending outwardly from the hub along the trailing side of the blades. The recesses permit limited angular movement of the blades relative to the hub. The blades have widths from the hub to the periphery of the cylindrical cavity greater than corresponding radii through the inner edges of the blades at the hub, whereby the blades are angularly inclined relative to such radii. Top portions of the blades are applied to peripheral wall portions of the cylindrical cavity. The recesses, the fixed projections, and peripheral wall portions of the cylindrical cavity cooperate to hold the blades in position. The fixed projections carry means for urging the blades toward the corresponding radii. The blades are biased or periodically adjusted angularly toward the mentioned corresponding radii during wear of the outer portions and the peripheral wall portions to maintain worn top portions of the blades applied to the peripheral wall portions of the cylindrical cavity.

5 Claims, 7 Drawing Figures

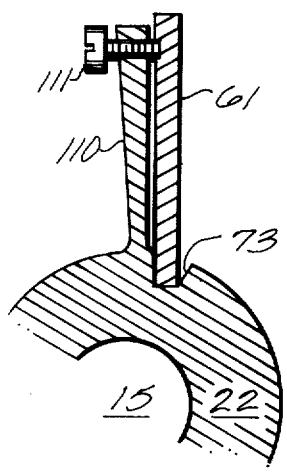
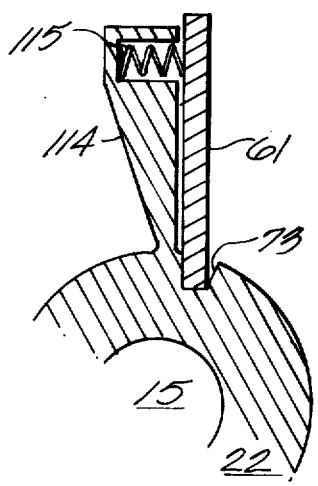
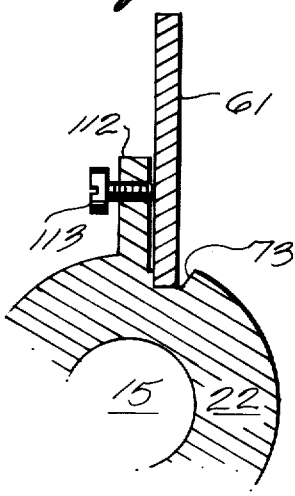
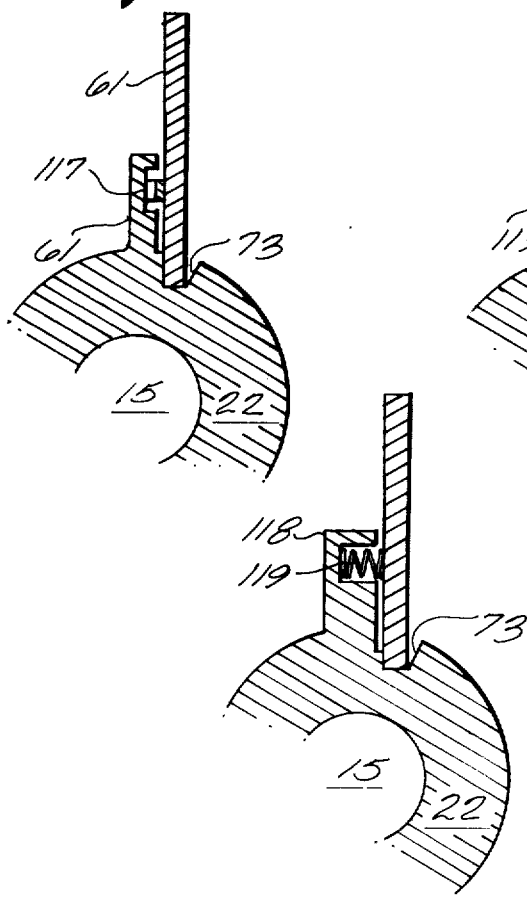

ROTARY FEEDER

BACKGROUND OF THE INVENTION

1. Field of the Invention

The subject invention relates to material feeding apparatus and, more specifically, to rotary transfer valves and rotary feeders, including apparatus for transferring material between different environments, including different pressure zones.

2. Prior Art

Rotary feeders and related apparatus are well known as may, for instance, be seen from U.S. Pat. Nos. 3,913,800, 3,895,745, 3,603,001, 3,231,105, 3,201,007, 3,077,272, 3,052,383, 2,984,872, 2,907,499, 2,888,175, 2,886,191, 2,879,094, 2,858,212, 2,806,636, 2,367,311, 1,215,531, 1,143,634, 659,086, 627,498, and U.S. Pat. No. Re. 26,275.

Existing rotary feeders with fixed, rigid blades tend to leak as their rotor blades or cavity walls wear in service. Rotor replacements or adjustments are time consuming and expensive and cause considerable down time of the equipment.

In many instances, material accumulates in the rotor pockets of the feeder and is difficult to remove without shutting down the installation. Such accumulating material gradually diminishes the capacity or throughout of the feeder and renders the same eventually useless. Present dislodgment techniques are not very effective; typical being the dropping of balls contained in a hollow portion of the rotor hub.

With the advent of new industrial processes which require abrasive solid materials to be handled at high temperatures, high pressures and high differential pressure between inlet and outlet, existing rotary feeder equipment is no longer adequate for continuous operation. Clearances between the rotor and the housing to compensate for thermal expansion become critical, and tend to cause seizure between the rotor and the housing. If these clearances are too large from initial seizing or wear, an inverse pressure results by air leaking between the rotor and housing in such quantities that it fluidizes the material in the inlet with resultant interrupted flow of material into the rotor pockets. Existing techniques provide flexible or adjustable tips on each blade in an effort to overcome the latter disadvantages. This, however, renders the construction more complex and expensive.

The present invention resides in a rotary feeder comprising, in combination, means including a housing for providing a cylindrical cavity having a longitudinal axis, an inlet issuing into a first peripheral portion of the cavity, an oulet interconnected with the cavity through a second peripheral portion circumferentially spaced from the first peripheral portion, the maximum dimension of each of the inlet and outlet parallel to the longitudinal axis being smaller than an axial dimension of the cylindrical cavity; means for successively transporting material from the inlet to the outlet through the cavity including a valvular rotor in the cylindrical cavity having a hub; means for mounting the hub for rotation about the longitudinal axis; means for defining a plurality of material-receiving pockets circumferentially distributed over the hub including rigid blades delimiting said pockets; means for mounting the blades for limited angular movement relative to the hub including axially extending recesses in the hub for receiving the inner edges of the blades and fixed projections extending outwardly from the hub adjacent to the recesses for supporting the blades, the blades having lateral dimensions extending in said cavity axially beyond the maximum dimension of each of the inlet and outlet and having widths from the recesses in the hub to the periphery of the cylindrical cavity greater than corresponding radii through inner edges of the blades at the recesses in the hub, whereby the blades are angularly inclined relative to the radii; wear compensating means on the fixed projections for applying outer edges of the blades opposite the inner edges to peripheral wall portions of the cylindrical cavity and for urging the blades angularly toward the corresponding radii to compensate for wear of the outer edges and the peripheral wall portions to maintain worn outer portions of the blades applied to or close to the peripheral wall portions of the cylindrical cavity; and means connected to the hub for rotating the valvular rotor in the housing. Wear compensating means include resilient means for biasing the blades toward the corresponding radii and gradually compensating for wear, and adjusting means for periodically moving the blades toward the corresponding radii to compensate for wear. The compensating means thus vary the inclination of the rigid blades relative to radii of the hub through the inner edges of the blade in the recesses of the hub.

BRIEF DESCRIPTION OF THE DRAWINGS

FIGS. 3–7 are sections of portions of a hub showing different embodiments of the fixed projection and wear compensating means for supporting and adjusting the blades.

DETAILED DESCRIPTION OF THE INVENTION

Figure 1:
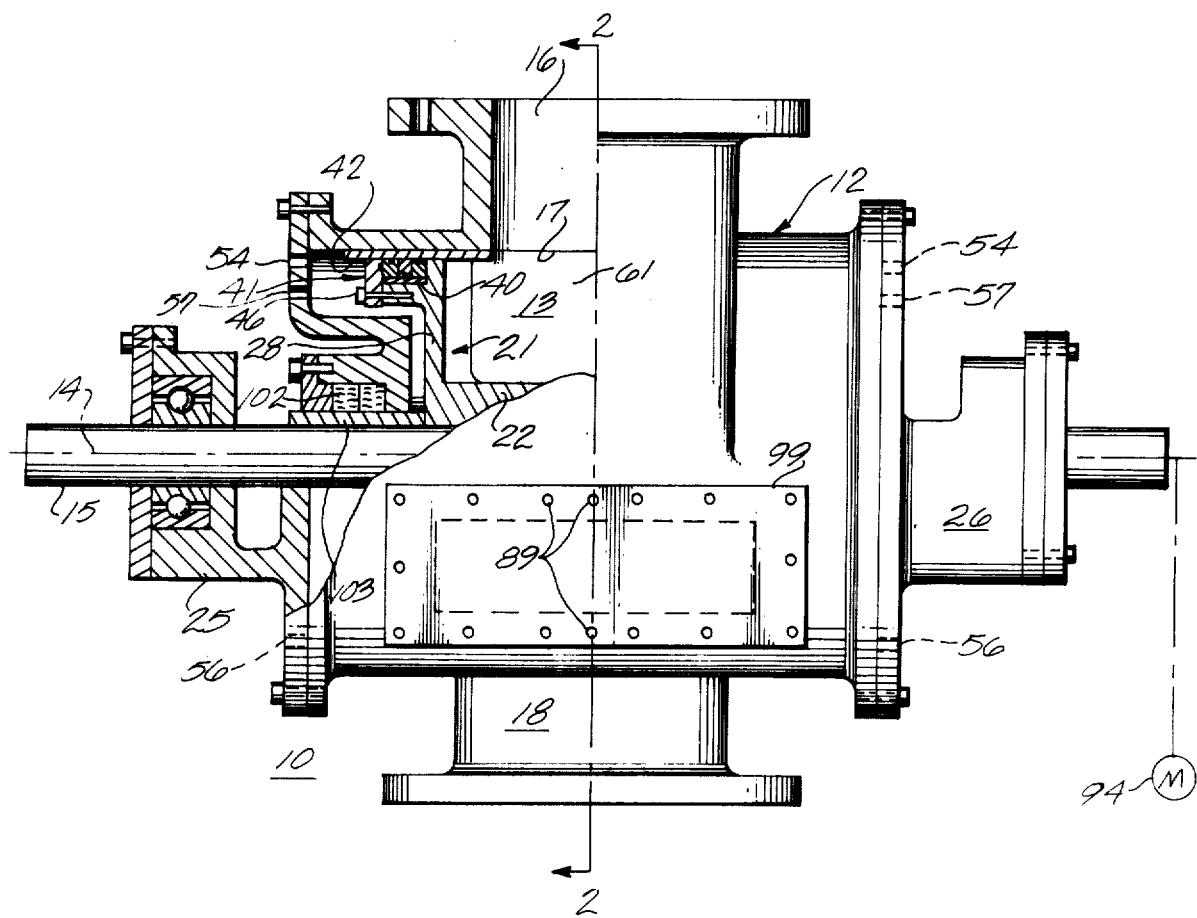
FIG. 1 is a side view, partially in section, of a rotary feeder in accordance with a preferred embodiment of the subject invention.
Figure 2:
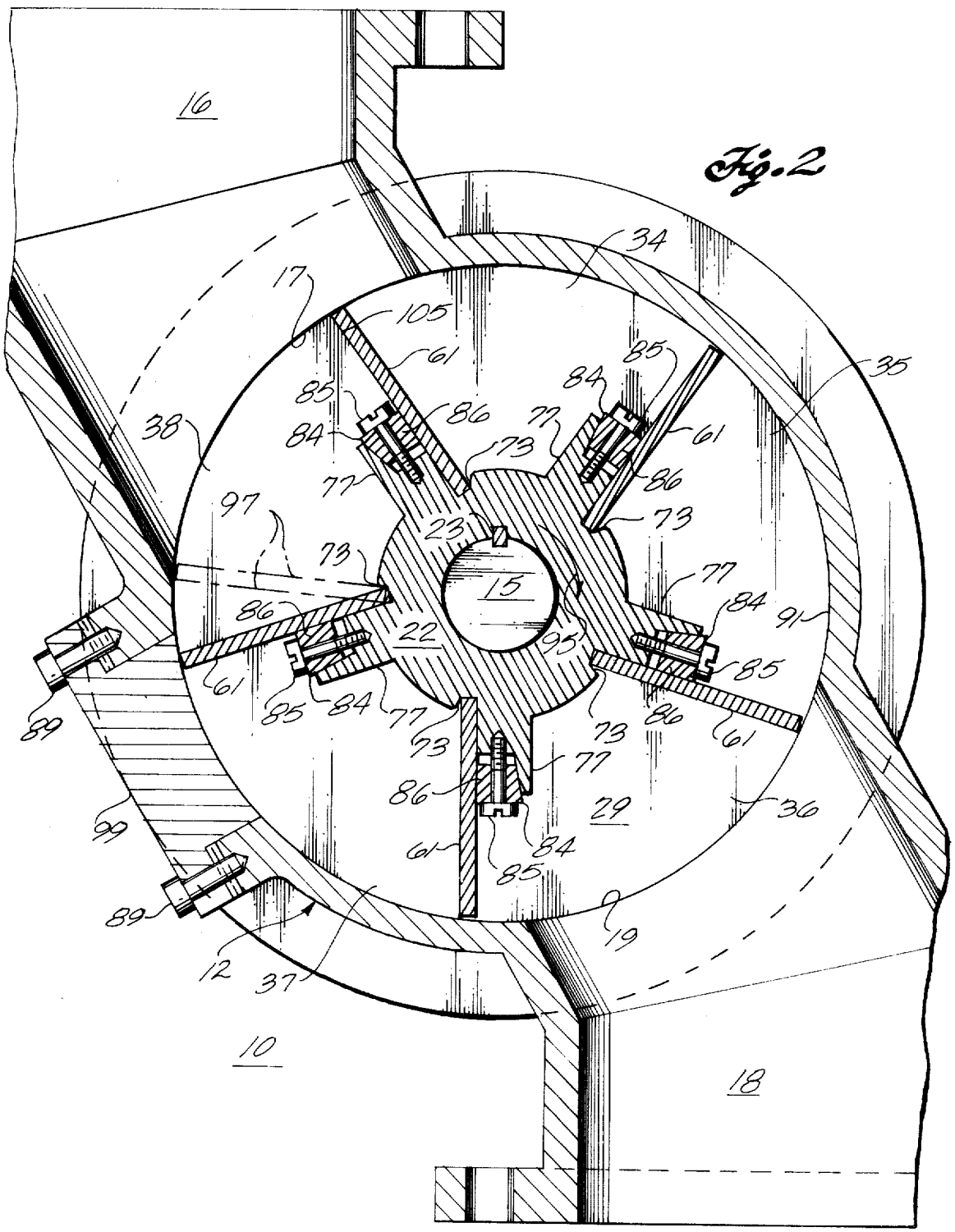
FIG. 2 is a section, on an enlarged scale, taken along the line 2—2 in FIG. 1.

The rotary feeder 10 according to the illustrated preferred embodiment of the subject invention shown in FIGS. 1 and 2 has a housing 12 which provides a cylindrical cavity 13 having a longitudinal axis 14 extending along a drive shaft 15. The housing 12 also has an inlet 16 which issues into a first peripheral portion 17 of the cavity 13. The housing further has an outlet 18 interconnected with the cavity 13 through a second peripheral portion 19 circumferentially spaced from the first peripheral portion 17. The maximum dimension of each of the inlet 16 and outlet 17 parallel to the longitudinal axis 14 is smaller than the axial dimension of the cylindrical cavity. In other words, the width of the cylindrical cavity is larger than the width of the inlet or outlet.

Means for successively transporting material from the inlet 16 to the outlet 18 through the cavity 13 include a valvular rotor 21 in the cavity having a hub 22 mounted on the shaft and connected thereto by a key member 23 or other means. A pair of bearings 25 and 26 mount the shaft 15 and rotor 21 for rotation about the longitudinal axis 14.

Two end plates 28 and 29 laterally define a plurality of material-receiving pockets 34 to 38 circumferentially distributed over the hub 22 and rotatable therewith.

The end plates 28 and 29 may either be integral with the hub 22 or separate therefrom. It is, of course, important that there be a tight seal between the inside of the end plates at the pockets 34 to 38 and the outside thereof.

By way of example, each end plate has a peripheral seal 41 which tightly engages either the inside of the adjacent cylindrical housing portion or, as shown at 42 in FIG. 1, a special liner of a wear-resistant material provided at the inside of the housing 12 and also a wear resistant liner on the rotor as shown at 40. The seal is adjustable with screw 46.

Ports 57 may be provided for the insertion of seal adjusting tools that engage screws 46. The ports 57 may be plugged if the rotary feeder is cooled with water or another coolant. FIG. 1 shows a coolant inlet at 56, and an outlet at 54. Coolant lines may be connected to inlet 56 and outlet 54. Other conventional cooling means such as a water jacket for the bearings and the like may be employed if desired.

The material-receiving pockets 34 to 38 are delimited by rigid blades 61 to which angularly define the material-receiving pockets. If desired, the blades may include wear-resistant strips rigidly attached to the outer edges of the blades for engaging peripheral wall portions of the cavity.

The blades 61 are simply accommodated in axial depressions, recesses or grooves 73 in the hub 22, the recesses acting as pivot points to allow the blades limited angular movement relative to the hub. Fixed projections or backup plates 77 support the blades in position on the hub 22.

Wear compensating means 84 include an adjustable screw 85 that cooperates with a wedging device 86 to maintain the blade 61 in a proper position. As the outer edge of the blade 61 wears, the rotor is periodically stopped and screws 85 are adjusted to compensate for the wear.

FIGS. 3–7 show other embodiments of the fixed projection and wear compensating means. In each, the blade 61 rests in a recess 73 in hub 22. In FIGS. 3 and 4, fixed projections 110 and 112 carry adjustable screws 111 and 113. In FIGS. 5, 6, and 7, projections 114, 116 and 118 carry spring biasing means 115, 117, and 119. Such biasing means bias the blades 61 into contact with the peripheral wall of the cavity and gradually compensate for wear without the need to stop the rotor for adjustment of screws.

A motor 94, shown only diagrammatically in FIG. 1, rotates the shaft 15 and the rotor structure in the direction of the arrow 95 for the transport of material transversely through the cavity 13 and the consequential feeding of the material from the inlet 16 to the outlet 18.

The blades 61 have lateral dimensions extending in the cavity 13 axially beyond the maximum dimension of each of the inlet 16 and outlet 18, as that the blades do not fall out through the inlet or outlet. Also, the blades 61 have widths from the recesses 73 in hub 22 to the periphery of the cylindrical cavity 13 longer than corresponding radii through inner portions of the blades at the recesses in the hub. Consequently, the blades are angularly inclined relative to such radii (see phanton lines 97), toward the trailing sides of the blades, that is, away from the direction of rotation of the rotor and toward the fixed projections supporting the blades.

As the blades 61, the liner 42 or the inside of the housing 12 wear through continued operation of the rotary feeder, the inclined blades are periodically angularly adjusted to move closer and closer to the corresponding radii until they have acquired the position shown at 97 in FIG. 2. When biasing means such as springs 115, 117, and 119 are used, the inclined plates gradually move angularly closer to the radii until they reach the position shown at 97. At this point, the blades are replaced.

The housing is provided with a removable access plate 99 for a convenient replacement of the blades or adjustment of the blade angle through manipulation of the screws 85, 111, or 113. When access plate is removed by withdrawing bolts 89, an access port 98 having a length parallel to the axis 14 at least as great as the length of the blades 61 is exposed. The blades can be removed or inserted through the access port without twisting or turning and without removing the entire rotor from the housing. Because the blades are not attached to the rotor, they can be removed quickly and simply for inspection or replacement. When the blades are supported by springs or other yieldable wear compensating means, a pin, screw, or bump (not shown) may be provided in the housing wall near outlet 18 at point 91 to engage the outer edges of the blades as they pass and impart slight angular movement to the blades to help dislodge material into the outlet.

It is within the scope of the subject invention that wear points or members other than the liner 42 be employed. Such a wear member may, for instance, be provided at the shaft 15 as shown at 103 to accept wear caused by a packing or shaft sealing device at 102.

To reduce wear, the blades may be adjusted to provide a slight clearance between the blades and the peripheral wall portion of the housing 12, as shown, for instance, by a dotted line at 105 in FIG. 2, in which the clearance is exaggerated for clarity. It should be noted that because the blades are free-floating, they will tend to drop into contact with the lower portions of the cylindrical cavity. Nevertheless, a useful reduction in wear may be obtained.

It will be noted that the disclosed rotor structure also lends itself to automatic thermal compensation as well as to automatic alignment of the sealing or working surfaces.

Abrasives and other materials may readily be transported by the illustrated rotary feeder against considerable pressure differentials.

The detailed disclosure will suggest or render apparent to those skilled in the art various modifications and variations within the spirit and scope of the subject invention, which is defined in the appended claims.

What is claimed is:

1. A rotary feeder comprising in combination:

means including a housing for providing a cylindrical cavity having a longitudinal axis, an inlet issuing into a first peripheral wall portion of said cavity, an outlet interconnected with said cavity through a second peripheral wall portion circumferentially spaced from said first peripheral wall portion, the maximum dimension of each of said inlet and outlet parallel to said longitudinal axis being smaller than an axial dimension of said cylindrical cavity;

means for successively transporting material from said inlet to said outlet through said cavity including a valvular rotor in said cylindrical cavity having a hub;

means for mounting said hub for rotation about said longitudinal axis;

means for defining a pluraltiy of material-receiving pockets circumferentially distributed over said hub including axially extending recesses in said hub and rigid blades delimiting said pockets and having inner edges freely resting in said recesses for limited angular motion relative to radii of said hub, fixed projections from said hub adjacent to said recesses for supporting said blades, said blades having lateral dimensions extending in said cavity axially beyond the maximum dimension of each of the inlet and outlet and having widths from the recesses in the hub to the periphery of the cylindrical cavity greater than the distances along corresponding radii through inner edges of the blade in the recesses to the periphery of the cylindrical cavity, whereby the blades are angularly inclined toward the projections relative to the radii;

wear compensating means on the fixed projections for urging outer edges of the blades opposite the inner edges toward peripheral wall portions of the cylindrical cavity and for urging the blades angularly toward the corresponding radii to compensate for wear of the outer edges and the peripheral wall portions; and means connected to the hub for rotating the valvular rotor in the housing.

2. A rotary feeder as claimed in claim 1 wherein said wear compensating means are adjustable means for varying the inclination of said rigid blades relative to said radii.

3. A rotary feeder as claimed in claim 1 wherein said wear compensating means are resilient means for biasing said blades toward said radii.

4. A rotary feeder as claimed in claim 3 including blade engagement means projecting into the paths of said blades for angularly rocking each blade during the rotation of said rotor whereby to eject deposits of material from said blades through said outlet.

5. A rotary feeder as claimed in claim 1 including a removable access plate in said housing constituting a portion of the peripheral wall of the cylindrical cavity, the peripheral wall portion of said access plate having a lateral dimension parallel to said axis of rotation at least as great as the greatest lateral dimension of said blades, whereby upon removal of said access plate said blades can be removed from the cylindrical cavity.

* * * * *